US007014152B2

(12) United States Patent
Grendahl

(10) Patent No.: US 7,014,152 B2
(45) Date of Patent: Mar. 21, 2006

(54) CONDUIT RACKING DEVICE

(76) Inventor: Mark S. Grendahl, 117 Belmont Rd., Apple Valley, MN (US) 55124

( * ) Notice: Subject to any disclaimer, the term of this patent is extended or adjusted under 35 U.S.C. 154(b) by 0 days.

(21) Appl. No.: 10/729,054

(22) Filed: Dec. 5, 2003

(65) Prior Publication Data
US 2004/0113028 A1 Jun. 17, 2004

Related U.S. Application Data

(63) Continuation-in-part of application No. 29/171,202, filed on Nov. 19, 2002, now Pat. No. Des. 489,960, which is a continuation-in-part of application No. 29/161,790, filed on Jun. 5, 2002, now Pat. No. Des. 475,307.

(51) Int. Cl.
F16L 3/00 (2006.01)
(52) U.S. Cl. .......................... 248/49; 248/68.1; 52/105
(58) Field of Classification Search ............... 248/68.1, 248/49, 523; 211/70.1, 70.6
See application file for complete search history.

(56) References Cited

U.S. PATENT DOCUMENTS

| D142,608 S | 4/1945 | Ziegfeld |
| D165,849 S | 2/1952 | Jordan |
| D167,043 S | 3/1952 | Kintz |
| 2,851,863 A * | 9/1958 | Theed .......................... 62/172 |
| 3,737,131 A * | 6/1973 | Larson .................. 248/220.41 |
| D347,586 S | 6/1994 | Kim |
| 5,478,174 A * | 12/1995 | Lenhart ........................ 406/88 |
| 5,577,328 A | 11/1996 | Kerry, Sr. |
| 5,685,816 A | 11/1997 | Romer |
| 5,971,329 A * | 10/1999 | Hickey ....................... 248/68.1 |
| 6,143,970 A * | 11/2000 | Kowzan ...................... 84/453 |
| 6,216,354 B1 | 4/2001 | Carbone |
| 6,278,061 B1 * | 8/2001 | Daoud ....................... 174/65 R |
| D448,406 S | 9/2001 | Lariviere, Jr. et al. |
| D448,802 S | 10/2001 | Lariviere, Jr. et al. |
| 6,434,844 B1 | 8/2002 | Rank |
| D475,307 S | 6/2003 | Grendahl |
| 6,578,282 B1 * | 6/2003 | Haegele et al. ............... 33/563 |
| 2004/0118982 A1 * | 6/2004 | Shillings et al. ........... 248/68.1 |
| 2004/0124320 A1 * | 7/2004 | Vantouroux ................ 248/68.1 |

* cited by examiner

Primary Examiner—Ramon O Ramirez
(74) Attorney, Agent, or Firm—Kinney & Lange, P.A.

(57) ABSTRACT

A conduit racking device provides an efficient and accurate method for racking conduit and marking locations of conduit entry holes to be formed in an electrical box. The conduit racking device is a shelf with a plurality of alignment holes arranged in a spaced pattern for receiving conduit. A brace is connected to the shelf for attaching the conduit racking device to a building structure.

9 Claims, 6 Drawing Sheets

CONDUIT RACKING DEVICE

CROSS-REFERENCE TO RELATED APPLICATION(S)

This application is a continuation in part of application Ser. No. 29/171,202 filed on Nov. 19, 2002 now U.S. Pat. No. D, 489,960 and entitled "Underground Conduit Stub Up Template," which is incorporated herein by reference and which is a continuation-in-part of application Ser. No. 29/161,790, filed on Jun. 5, 2002 and entitled "Electrician's Centerline Template" (now Design Pat. No. D475,307).

BACKGROUND OF THE INVENTION

The present invention relates generally to the fields of templates and racks for use in the construction industry. In particular, the present invention relates to a device for racking electrical conduit and transcribing conduit entry hole locations on an electrical box.

In the construction industry, electrical wires are often run through piping to safely deliver electricity to different areas of a building. This piping, referred to as "conduit" in the electrical trade, is typically constructed from metal or plastic and comes in a variety of standardized sizes. The size of conduit used to run a particular electrical line depends both upon the length of the run as well as the particular power application.

Certain construction situations require electrical conduit to be run underground beneath a building to reach electrical installations both inside and outside the building. For example, in commercial buildings, the building's main power feed commonly enters the building from below ground. Conduit is also frequently run underground from one part of a building to another, as well as to electrical installations outside the building. Oftentimes underground conduit running into a building is connected to aboveground electrical boxes located inside the buildings. Such installations typically involve multiple runs of conduit interfacing with the bottom of an electrical box, which requires the conduit to be organized into a spaced configuration before being connected to the electrical box. In the electrical trade, organizing the conduit into a fixed configuration is often referred to as "racking."

It is not uncommon for conduit to be installed beneath a building before pouring the building's slab. In locations where the conduit will be connected to an aboveground electrical box, the conduit is oriented vertically to reach the location where the panel box will ultimately be installed. Oftentimes the conduit is installed in a location that will eventually become the interior of a wall. A makeshift support framework of vertical posts and cross braces is usually constructed to aid in racking the conduit. Constructing such a framework, and strapping the conduit to the framework in an organized and spaced pattern, can be a rather labor intensive endeavor.

After the conduit is strapped to the makeshift support framework, the conduit is cut to locate the upward ends of the conduit at the height where the bottom of an electrical box will be installed. Prior to installing the electrical box, the configuration of the conduit must be transposed onto the bottom of the electrical box to ensure a proper fit. The traditional method for doing this entails using a ruler or tape measure to mark the location of each particular conduit entry hole. In making these measurements, the spacing of the conduit from each other and from the rear edge of the electrical box must be taken into account. As such, when multiple rows and/or columns of conduit are to be installed this task can become time consuming, tedious, and prone to measuring errors.

Thus, under the traditional method, racking conduit and connecting the conduit to an electrical box involves two labor intensive steps. To date, there has not been a systematic and efficient way to both rack conduit and transpose the racking configuration onto the bottom of an electrical box to make entry holes into the box.

Measuring aids for speeding up the process of laying out entry holes on an electrical box are known. The measuring aids, however, are not capable of racking conduit. For example, U.S. Pat. No. 5,577,328 discloses a stencil with pre-measured markings to aid in the measuring process. The stencil is capable of measuring a variety of conduit entry hole sizes. However, an electrician using the stencil can lay out only one entry hole at a time, and must reposition the stencil before measuring an adjacent entry hole. In addition, the stencil does not account for the thickness of strut used to secure the conduit to a construction structure. Thus, the measuring process still requires a multitude of measurements and an opportunity for error exists when repositioning the stencil for each individual entry hole.

U.S. Pat. No. 4,584,780 also discloses a template for laying out conduit entry holes on an electrical box. The template, however, must also be repositioned to measure each entry hole and does not account for the thickness of strut used to secure the conduit to a construction structure. Moreover, the template also cannot be used to rack conduit.

Therefore, given the limitations of the prior art, a device and method for both racking conduit and transposing conduit racking patterns onto electrical boxes is needed to speed the accuracy and timing of conduit installations.

BRIEF SUMMARY OF THE INVENTION

The invention is a conduit racking device comprising a shelf with a plurality of alignment holes arranged in a spaced pattern for receiving conduit. A brace is connected to the shelf for attaching the conduit racking device to a building structure.

DETAILED DESCRIPTION

Figure 1:
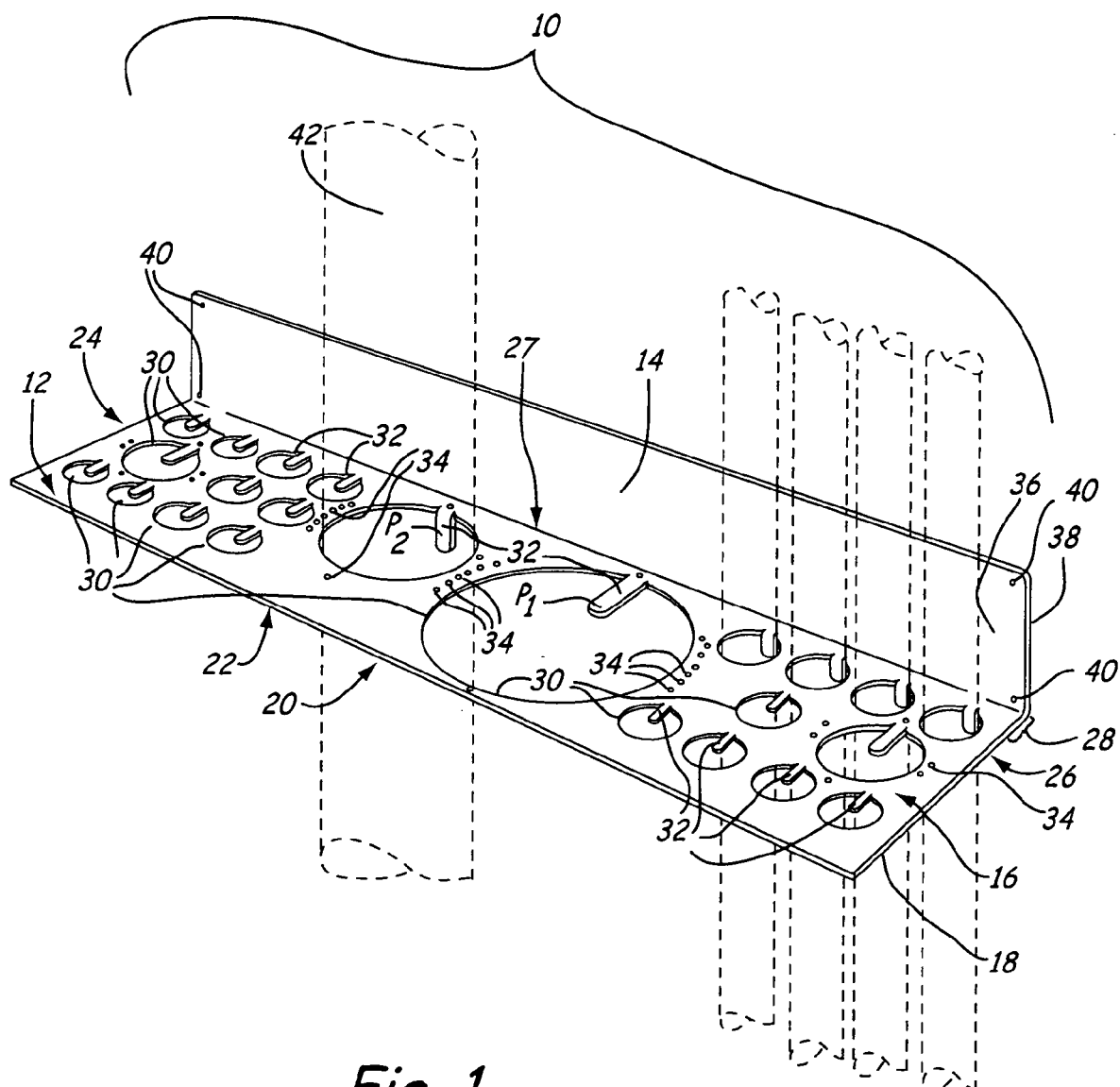
FIG. 1 is a top perspective view of a conduit racking device.
Figure 2:
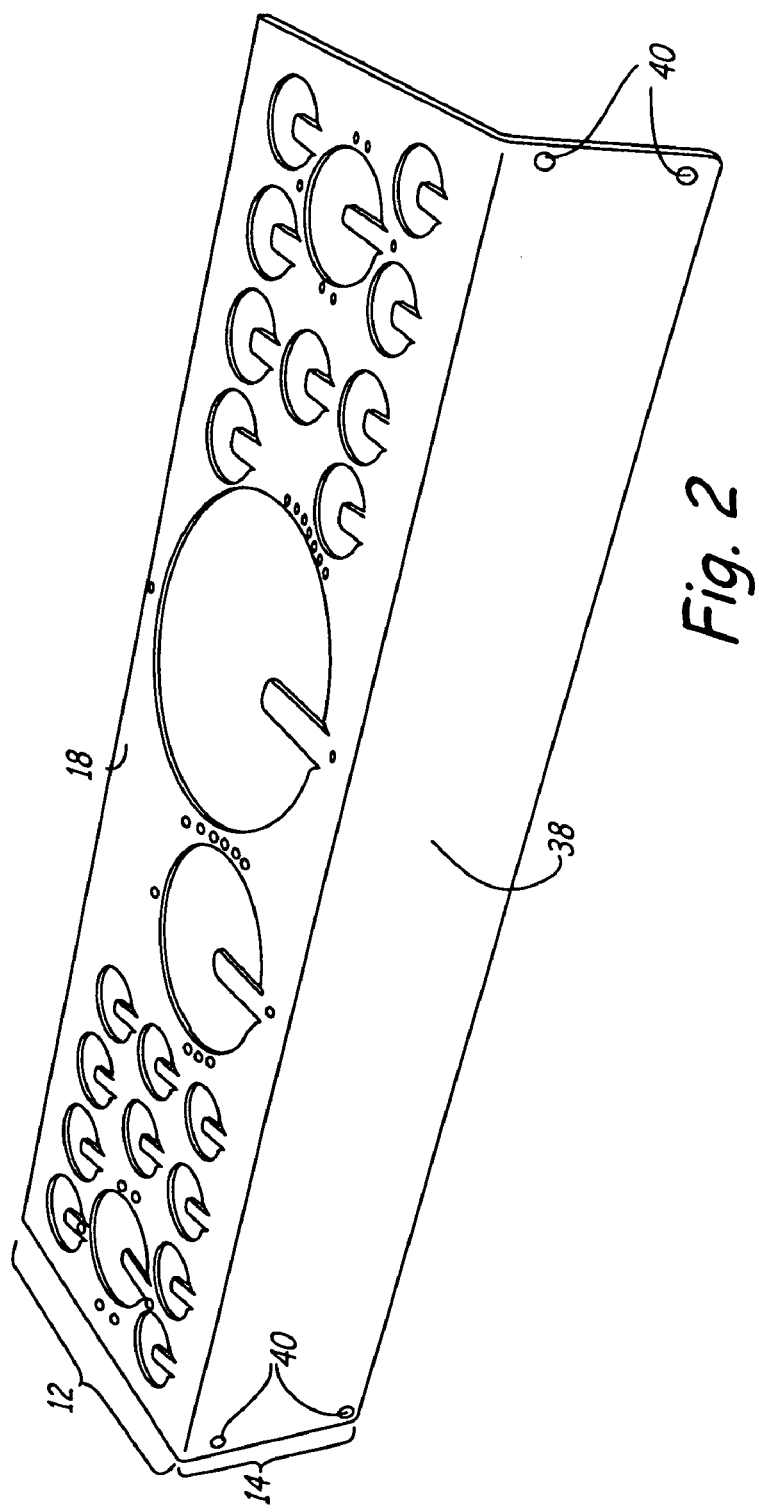
FIG. 2 is a bottom perspective view of the conduit racking device of FIG. 1.
Figure 3:
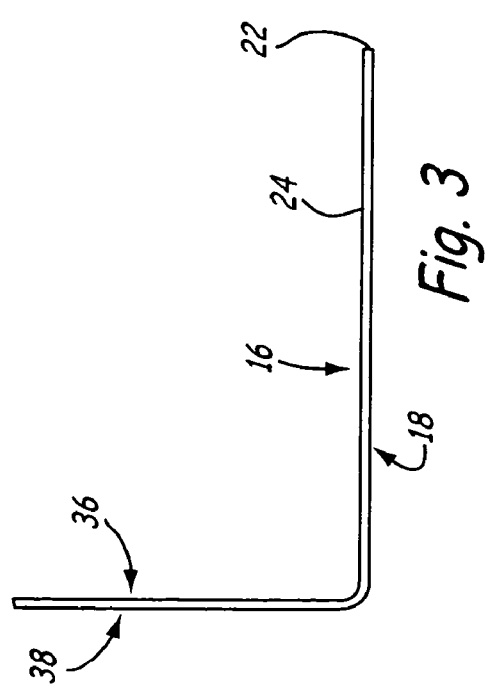
FIG. 3 is a side view of the conduit racking device of FIG. 1, the other side view being the same as that shown.

A conduit racking device 10 is shown in FIG. 1–3, with FIG. 1 showing a top perspective view of conduit racking device 10, FIG. 2 showing a bottom perspective view of conduit racking device 10, and FIG. 3 showing an end view of conduit racking device 10.

Referring to FIG. 1, conduit racking device 10 comprises a shelf 12 and a brace 14. Shelf 12 has a top face 16, a bottom face 18, and a perimeter 20 that includes a longitudinal straight edge 22, transverse straight edges 24 and 26, and an interface 27. Shelf 12 also has a spacer zone 28, a plurality of alignment holes 30, conduit supports 32, and centerline marking apertures 34. Brace 14 has a front face 36, a rear face 38, and mounting apertures 40.

Top face 16 and bottom face 18 of shelf 12 are bounded by perimeter 20, which in this embodiment forms a rectangle. Perimeter 20 is made up of longitudinal straight edge 22, transverse straight edges 24 and 26, and interface 27. Shelf 12 and brace 14 are connected at interface 27 and are disposed at a right angle. Mounting apertures 40 are located at each corner of brace 14 and extend from front face 36 to rear face 38.

Shelf 12 has a plurality of alignment holes 30 extending from top face 16 to bottom face 18. Alignment holes 30 are spaced apart from one another in accordance to industry standards for electrical conduit installation. For example, under one industry standard, alignment holes 30 may be required to be spaced at least approximately ¼ of an inch from one another. In the embodiment of FIG. 1, the plurality of alignment holes 30 are circular and not all the same size, although it is contemplated that the holes may be the same size and may take other shapes. The plurality of alignment holes 30 are spaced from interface 27 by spacer zone 28, which extends along the length of interface 27 on shelf 12. Each of the alignment holes 30 is associated with a conduit support 32, which in a first position P1 is planar with shelf 12 and extends from the periphery of the alignment hole towards the center of the alignment hole. Conduit supports 32 are deformable from the first position P1 to a second position P2 that is perpendicular to shelf 12. In addition, centerline marking apertures 34, which extend through shelf 12 from top face 16 to bottom face 18, may be located in close proximity to one or more of the alignment holes 30.

In the embodiment of FIG. 1, conduit racking device 10 is formed from a single rectangular sheet of galvanized sheet metal, which is bent along interface 27 to form the shelf and brace structures. The present invention, however, need not be constructed from either a single sheet of material or even a sheet material. For example, although brace 14 is shown as comprising a unitary attachment sheet, it may also comprise multiple distinct posts or uprights that may or may not be formed separately from shelf 12 and later attached. The multiple distinct posts or uprights may be constructed from tubes or rods or any other suitable form of material. It is further contemplated that the present invention may be formed from any suitable rigid material such as, for example, rigid plastic or metal.

Shelf 12 and brace 14 are preferably disposed at a ninety-degree angle. In this configuration, brace 14 may be flush-mounted to a flat or linear construction structure so that shelf 12 extends out perpendicularly from the construction structure. When flush-mounted, alignment holes 30 in shelf 12 are oriented perpendicular to the construction structure so that conduit run through alignment holes 30 are oriented parallel to the construction structure. Nonetheless, so long as brace 14 provides sufficient bracing support for shelf 12, brace 14 and shelf 12 need not be disposed at a ninety-degree angle. Thus, the interface between the shelf and the brace may be located anywhere on the shelf so long as sufficient bracing support is provided to the shelf.

Spacer zone 28 preferably has a uniform width of either approximately ¾ of an inch or 1½ inches. These widths correspond to the thickness of the struts or channels routinely used in the electrical industry to secure electrical conduit to construction structures.

Figure 4:
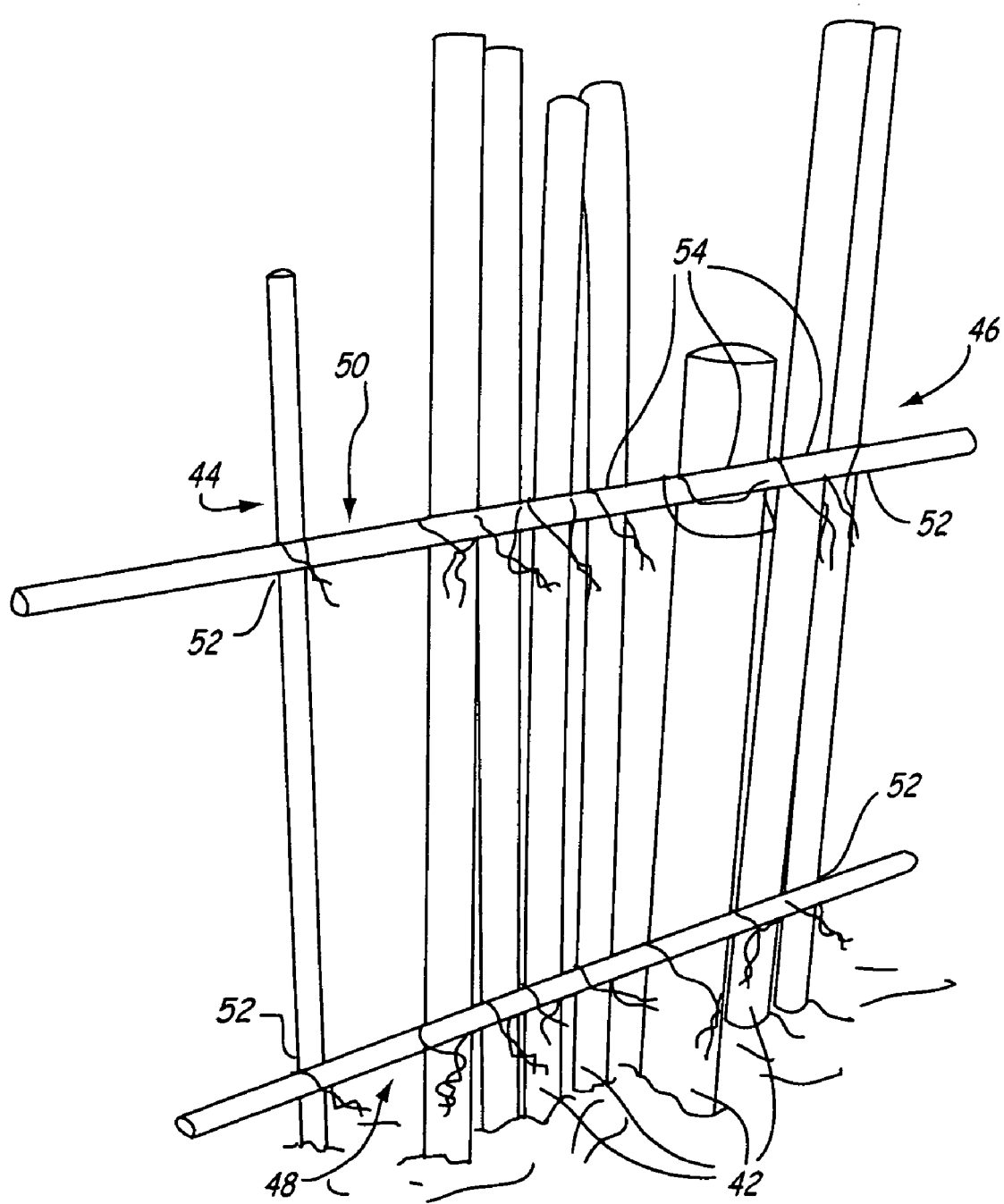
FIG. 4 is a perspective view of a prior art makeshift framework for racking conduit in a spaced vertical configuration.

FIG. 4 shows a typical prior art method for racking conduit in a spaced, vertical configuration. A makeshift framework is first constructed consisting of vertical supports 44 and 46 and horizontal supports 48 and 50, which are lashed together at juncture points 52. Conduit 42 are then strapped to horizontal supports 48 and 50 at strapping points 54 to maintain the vertically-spaced orientation of conduit 42.

Figure 5:
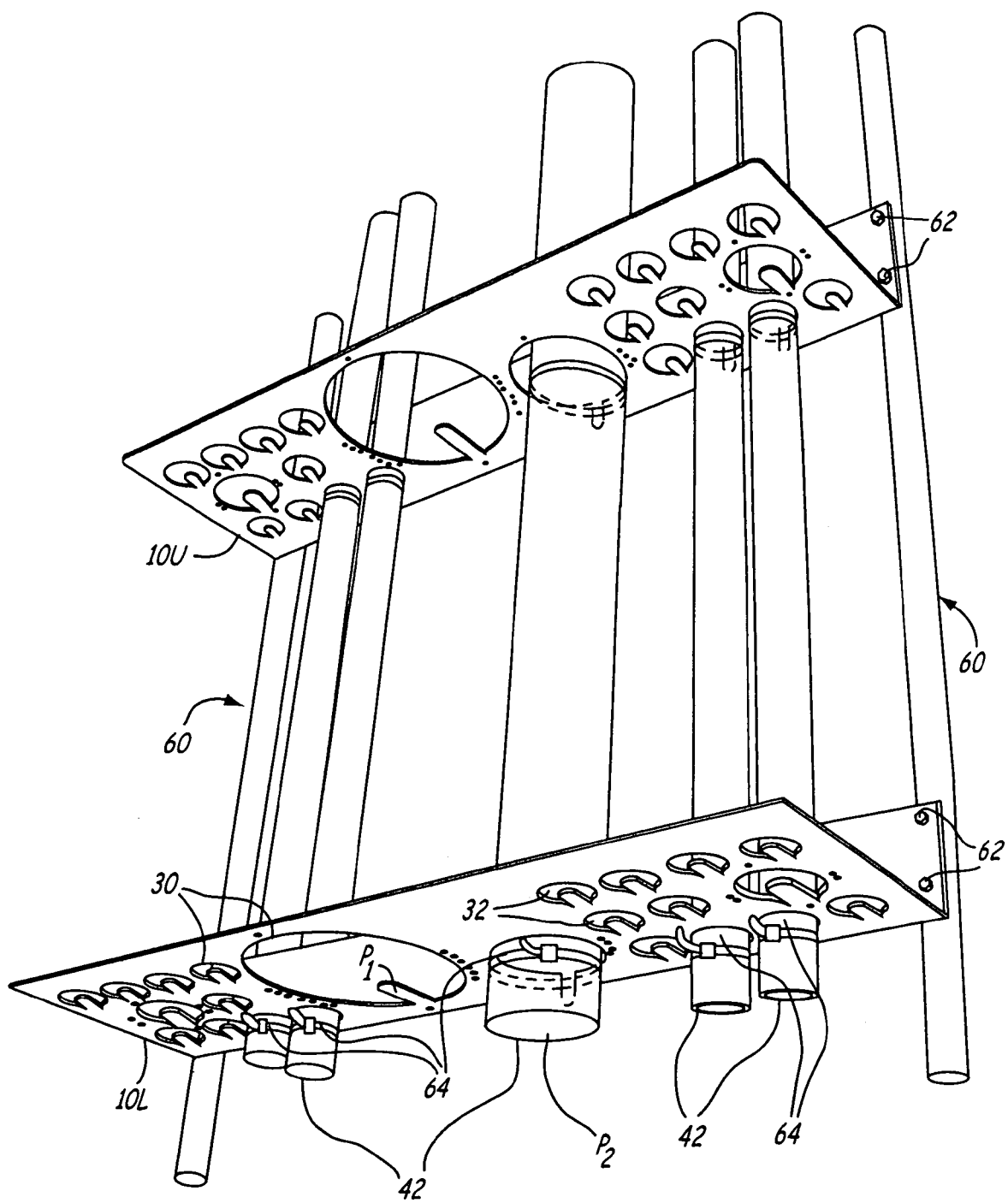
FIG. 5 is a perspective view of two conduit racking devices of FIG. 1 used to vertically rack conduit in a spaced configuration.

The present invention offers a more systematic and efficient approach to racking conduit. FIG. 5 shows conduit that have been racked vertically using the conduit racking device 10 of FIG. 1. An upper conduit racking device 10U and a lower conduit racking device 10L are mounted to a construction structure 60 by inserting fasteners 62 through mounting apertures 40 and into construction structure 60. Fasteners 62 may consist of nails, screws, or any other suitable fastening means. Although two or more racking devices are not necessary for all applications, the use of multiple racking devices is preferable because each conduit is then supported at multiple locations along its length, thereby limiting the freedom of movement of the conduit and fixing it in a desired orientation.

When racking conduit using the present invention, the conduit racking devices are first mounted to the construction structure in a spaced pattern so that each conduit racking device is aligned in the same orientation. The spacing between conduit racking devices can vary from as little as 3 to 6 inches to as many feet as is structurally feasible. In most situations, construction structure 60 is a vertical wall or a vertical support framework, however, use of the present invention is not restricted to vertical applications. The present invention may also be mounted to ceilings or other horizontal or non-vertical structures.

After mounting conduit racking devices 10U and 10L, each of the conduit supports 32 extending into alignment apertures 30 through which conduit will be run are deformed from first position P1 to second position P2. Conduit 42 is then inserted through the alignment holes having conduit supports 32 deformed to position P2. Next strapping means 64 are used to secure conduit 42 to each of the conduit supports 32 deformed to position P2. Strapping means 64 preferably comprise plastic or metal ties, which are cinched around both conduit 42 and conduit support 32, however, any other suitable means may be used to secure conduit 42 to conduit supports 32. The end result is multiple conduit 42 spaced apart from one another and fixed in a parallel orientation to construction structure 60.

Figure 6:
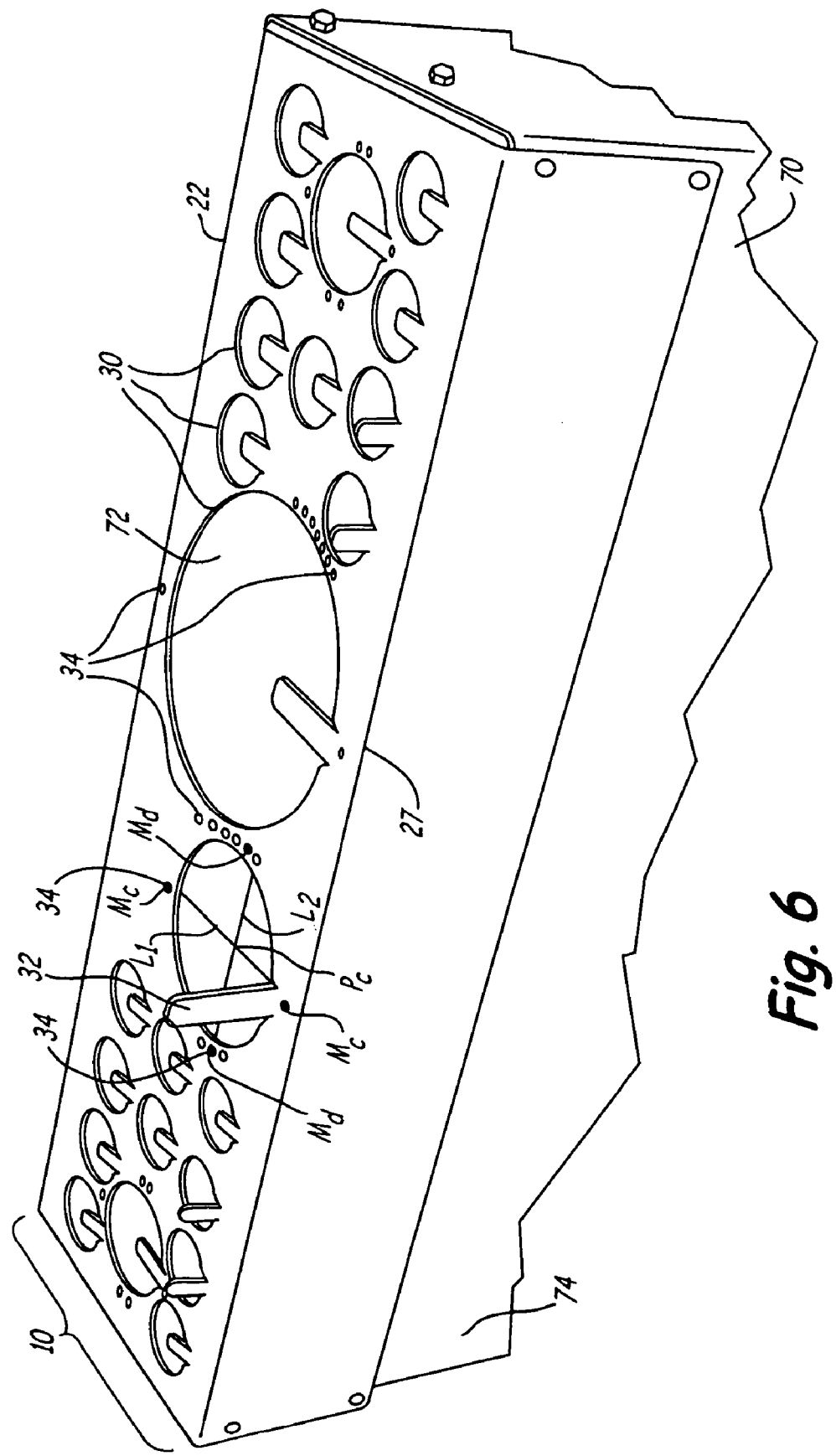
FIG. 6 is a perspective view of the conduit racking device shown in FIG. 1 used to mark conduit entry holes on the bottom side of an electrical box.

FIG. 6 shows how conduit racking device 10 can be used to mark the locations of conduit entry holes on the bottom surface of an electrical box. Preferably conduit racking device 10 is used to mark the conduit entry holes on the electrical box prior to the box being installed. Referring to FIG. 6, electrical box 70 has a bottom surface 72 and a rear surface 74. Conduit 10 is applied to electrical box 70 so that top face 16 of shelf 12 and front face 36 of brace 14 engage bottom surface 72 and rear surface 74, respectively. A marking tool is then used to mark the locations of the conduit entry holes on bottom surface 72.

Electrical boxes frequently have rear supports that protrude outward from rear surface 74 to engage a construction structure such as, for example, a wall. These rear supports are typically located on rear surface 74 in close proximity to the two corners in the electrical box which are formed, in part, by bottom surface 72 and rear surface 74. Each rear support may have a hole formed therein for passage of a fastener to attach the electrical box to the construction structure. To ensure that conduit racking device 10 locates the conduit entry holes on bottom surface 72 so that conduit spacing from the construction structure is preserved, brace 14 may be sized to at least partially cover the protruding rear supports and simulate the position of the construction structure.

The method used to mark the conduit entry holes may vary depending upon the size of the conduit and whether the particular alignment hole 30 is equipped with centerline marking apertures 34. For smaller alignment holes sized to fit only one size of conduit, such as for example ¾-inch conduit, the location of the entry holes are marked on the box by tracing around the periphery of the alignment hole with a marking tool. A different marking technique is used for larger alignment holes sized to fit multiple sizes of conduit. For these alignment holes, centerline marking apertures 34 should be used to locate the center point, Pc, for each conduit entry hole. Perpendicular intersecting lines, L1 and L2, are drawn using centerline marking apertures 34 to locate each of the Pc. Centerline marking apertures 34 are positioned around alignment holes 30 so that the perimeter of the conduit entry holes, no matter the size of the entry hole, will line up with alignment holes 30 at the conduit support side edge of alignment holes 30. Such positioning of the centerline marking apertures ensures that conduit strapped to mounted conduit racking devices will line up with the entry hole. Thus, the closer Pc is located to conduit support 34, the smaller the size of the conduit for which that Pc is associated.

An individual alignment hole 30 may be sized, for example, to receive up to 4-inch inner diameter conduit, but may also be sized to accommodate 3.5, 3, 2.5, 2, 1.5, and 1.25 inch diameter conduit. To use an alignment hole 30 to mark Pc for an entry hole to be located on bottom surface 72 of electrical box 70, a mark Mc is first placed in each of the centerline marking apertures 34 closest to longitudinal straight edge 22 and interface 27. Then a mark Md is made in the two centerline marking holes 34 corresponding to the particular size of conduit the entry hole will receive. After marking these points, conduit racking device 10 is then repositioned (not shown) atop electrical box 70. Longitudinal straight edge 22 is used to draw L1 through both Mc points and L2 through both Md points, whereby Pc for that particular size entry hole is located at the intersection of L1 and L2. If further entry holes are desired, those holes are then marked, at which point the entry holes may be either drilled or cut through bottom surface 72 of electrical box 70.

Figure 7:
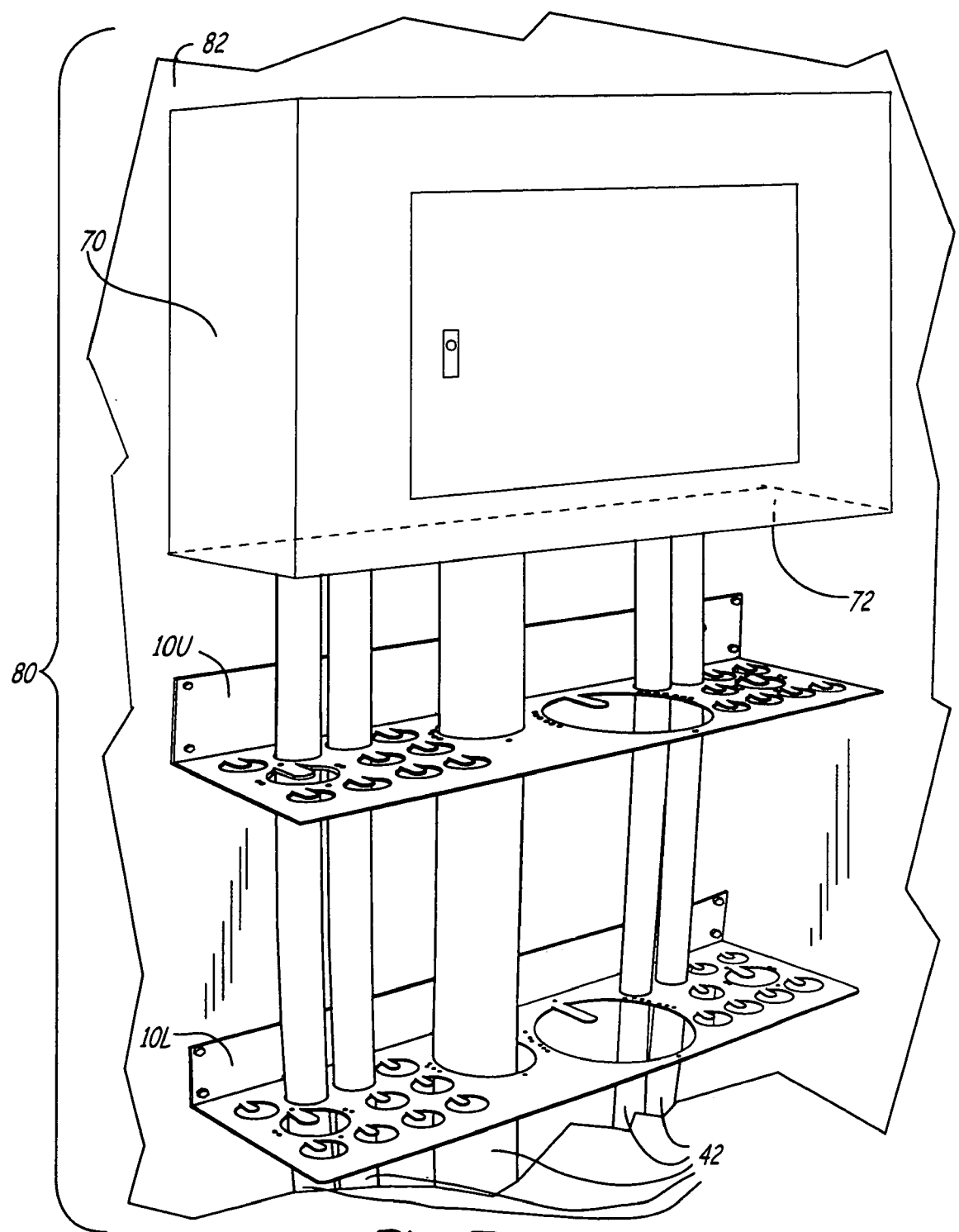
FIG. 7 is a perspective view of a final installation of racked conduit hooked up to an electrical box.

FIG. 7 shows a final installation 80 of racked conduit hooked up to an electrical box. Conduit 42 is racked by upper and lower conduit racking devices 10, denoted 10U and 10L, which are mounted to a wall 82. Electrical box 70 having a bottom surface 72 is also mounted to wall 82. Conduit 42, which is racked in a spaced configuration, connects to bottom surface 72 of electrical box 70. In this embodiment, conduit racking devices 10U and 10L were not removed prior to the installation of electrical box 70 and were retained to provide support for conduit 42. In other installations, conduit racking devices 10U and 10L may be removed prior to the final installation.

Although the present invention has been described with reference to preferred embodiments, workers skilled in the art will recognize that changes may be made in form and detail without departing from the spirit and scope of the invention.

The invention claimed is:

1. A method for arranging conduit into a pattern of parallel spaced conduit comprising:
 providing one or more conduit racking devices each having a shelf with a plurality of alignment holes for receiving conduit, wherein each alignment hole has a tab;
 securing the one or more conduit racking devices to a building structure; and
 placing conduit through one or more of the alignment holes in each of the one or more conduit racking devices; and
 strapping the conduit to the tabs.

2. The method of claim 1, wherein each conduit racking device is secured to the building structure before placing conduit through one or more of the plurality of alignment holes in each conduit racking device.

3. The method of claim 1, wherein the plurality of alignment holes are arranged in a spaced pattern on the shelf of each conduit racking devices.

4. The method of claim 1 and further comprising:
 using the plurality of alignment holes to mark the location of one or more conduit entry holes on a construction surface.

5. The method of claim 4, wherein the construction surface is a surface on an electrical box.

6. The method of claim 1, wherein the tabs are located on the shelf so that, when the one or more conduit racking devices are secured to the building structure, the tabs are spaced from the building structure by a spacer zone on the shelf having a uniform width so that the conduit, when strapped to the tabs, is spaced from the building structure by the spacer zone.

7. A method for arranging conduit for coupling with an electrical box into a pattern of parallel-spaced conduit, the method comprising:
 providing one or more conduit racking devices each having a shelf with a plurality of alignment holes for receiving conduit, wherein each alignment hole has a tab;
 bending one or more of the tabs to indicate the pattern of parallel-spaced conduit;
 marking the electrical box using the alignment holes with bent tabs;
 securing the one or more conduit racking devices to a building structure; and
 placing conduit through the one or more alignment holes with bent tabs in each of the one or more conduit racking devices and securing the conduit to the tabs.

8. The method of claim 7, wherein the one or more conduit racking devices are secured to the building structure prior to bending the tabs.

9. The method of claim 8 and further comprising removing one conduit racking device secured to the building structure and using the conduit racking device to mark the electrical box.

* * * * *

UNITED STATES PATENT AND TRADEMARK OFFICE
CERTIFICATE OF CORRECTION

PATENT NO. : 7,014,152 B2  Page 1 of 1
APPLICATION NO. : 10/729054
DATED : March 21, 2006
INVENTOR(S) : Mark S. Grendahl It is certified that error appears in the above-identified patent and that said Letters Patent is hereby corrected as shown below:

Column 5, Line 1, delete "comers", insert --corners--

Signed and Sealed this

Second Day of January, 2007

JON W. DUDAS
*Director of the United States Patent and Trademark Office*